United States Patent [19]

Kurtz

[11] Patent Number: 4,620,567
[45] Date of Patent: Nov. 4, 1986

[54] SOLENOID-OPERATED VALVE

[75] Inventor: Ronald C. Kurtz, Irwin, Pa.

[73] Assignee: American Standard Inc., Wilmerding, Pa.

[21] Appl. No.: 758,698

[22] Filed: Jul. 15, 1985

Related U.S. Application Data

[63] Continuation of Ser. No. 527,046, Aug. 29, 1983, abandoned.

[51] Int. Cl.$^4$ .............................................. F16K 11/04
[52] U.S. Cl. .................................... 137/627.5; 91/426
[58] Field of Search ..................... 91/426; 137/627.5; 251/129.03

[56] References Cited

U.S. PATENT DOCUMENTS

| | | | |
|---|---|---|---|
| 2,900,960 | 8/1959 | Gratzmuller | 91/426 |
| 2,959,426 | 11/1960 | Augustin | 137/627.5 X |
| 2,985,490 | 5/1961 | Gates | 137/627.5 |
| 3,107,693 | 10/1963 | Puster | 137/627.5 X |
| 3,181,917 | 5/1965 | Dobrikin | 137/627.5 |
| 3,411,539 | 11/1968 | Machado | 137/627.5 |
| 3,559,688 | 2/1971 | Fischer | 137/627.5 |
| 4,344,603 | 8/1982 | Hozumi | 251/129.03 |

FOREIGN PATENT DOCUMENTS

| | | | |
|---|---|---|---|
| 190810 | 7/1957 | Austria | 137/627.5 |
| 2138658 | 8/1971 | Fed. Rep. of Germany | 137/627.5 |

Primary Examiner—Robert G. Nilson
Attorney, Agent, or Firm—J. B. Sotak

[57] ABSTRACT

A solenoid-operated fluid control valve having manual override and fluid latching for establishing a fluid path between a supply port and a delivery port when a brake-release solenoid pilot valve coil is momentarily energized to cause a pilot piston to close an exhaust valve and to open a supply valve for causing feedback pressure to be fed from a delivery chamber to a pilot chamber for fluid latching the pilot piston in a brake-release position until a brake-application solenoid pilot valve coil is momentarily energized which causes the pilot chamber to exhaust to atmosphere so that the pilot piston returns and opens the exhaust valve and allows the closure of the supply valve.

9 Claims, 3 Drawing Figures

SOLENOID-OPERATED VALVE

This is a continuation, of application Ser. No. 527,046, filed Aug. 29, 1983, now abandoned.

FIELD OF THE INVENTION

This invention relates to a solenoid-operated pilot valve having manual override and fluid latching and, more particularly, to an electromagnetically-controlled pneumatic valve for establishing a fluid path between a supply port and a delivery port when a release electromagnet is energized to cause a pilot piston to close an exhaust valve and to open a supply valve for establishing a feedback path between a delivery chamber and a pilot chamber for pneumatically latching the pilot piston in position until an application electromagnet is energized which causes the pilot chamber to exhaust so that the pilot piston returns and opens the exhaust valve and allows the closure of the supply valve.

BACKGROUND OF THE INVENTION

In mass and/or rapid transit operations, it is conventional practice to employ a solenoid control valve to operate a spring-applied pneumatically-released brake assembly on the transit vehicles. In operation, an electrical command signal is momentarily applied to the solenoid to establish a connection to release the brakes or to establish a connection to apply the brakes. It will be understood that in the event that the pneumatic power supply is interrupted, the brakes will be applied by the spring in the brake unit. Now, when the fluid brake pressure is reapplied to the valve, the valve must assume the brake-applied position. It will be appreciated that if the valve remains in or assumes brake-released position, the resulting brake release would cause a potentially dangerous and unsafe condition. Thus, it is necessary that the valve causes the delivery chamber and port to be exhausted since the brakes are applied when there is no air pressure being conveyed to the brake unit.

OBJECTS OF THE INVENTION

Accordingly, it is an object of this invention to provide a new and improved solenoid-operated fluid control valve.

Another object of this invention is to provide an electromagnetic pilot valve having manual override and fluid latching.

A further object of this invention is to provide a unique solenoid-type of fluid control valve having an application and release coil for causing the pneumatic operation of a pilot piston for opening and closing a supply valve and an exhaust valve.

Yet another object of this invention is to provide an improved electromagnet control valve having a pair of pilot valves which are selectively operated by momentary energization of one of a pair of electromagnetic coils.

Yet a further object of this invention is to provide a solenoid-operated fluid valve comprising, a release solenoid coil, an application solenoid coil, valve means movable to a first position for establishing a fluid path between a supply port and a delivery port when the release solenoid coil is momentarily energized, fluid means for latching the valve means in the first position, and the valve means movable to a second position for establishing a fluid path between the delivery port and a exhaust port when the application solenoid coil is momentarily energized.

Still another object of this invention is to provide a magnet valve for selectively establishing communication between a supply port and a delivery port and between an exhaust port and the delivery port comprising, a magnet portion having an application solenoid valve and a release solenoid valve, a valve portion having a pilot piston, an exhaust seat and a supply chamber connected to the supply port, a delivery chamber connected to the delivery port, a pilot chamber connectable to the supply port through the release solenoid valve to cause movement of the pilot piston wherein the exhaust is closed and the supply valve opens communication between the supply chamber and the delivery chamber, and means connecting the delivery chamber to the pilot chamber for retaining the pilot piston in the moved position.

SUMMARY OF THE INVENTION

In accordance with the present invention, there is provided an electromagnetic control valve having first and second solenoids for controlling the condition of first and second spring-biased pilot valves. A spring-biased pilot piston is movable between a first and a second position. A pilot chamber located on one end of the pilot piston and a delivery chamber located on the other end of the pilot piston. An exhaust valve seat formed on the other end of the pilot piston and leading to an exhaust port. A supply port disposed adjacent the exhaust valve seat and normally biased to close off a supply chamber from the delivery chamber. A supply port connected to the supply chamber and to the first pilot valve. A delivery port connected to the delivery chamber, and a feedback path connected from the delivery chamber to the pilot chamber for latching the pilot piston in the second position.

BRIEF DESCRIPTION OF THE DRAWINGS

The above objects and other attendant features and advantages will be more readily understood from the following detailed description of the invention when considered in conjunction with the accompanying drawings, wherein.

DETAILED DESCRIPTION OF THE INVENTION

Figure 1:
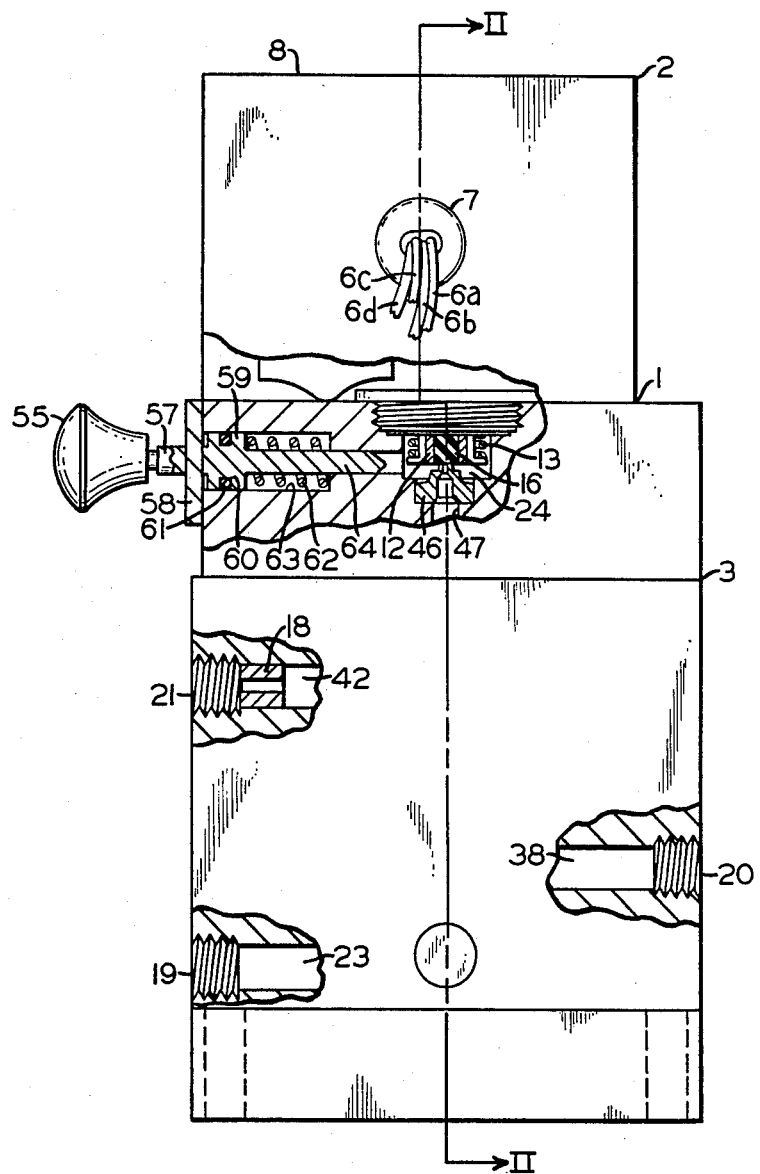
FIG. 1 is a side elevational view of the solenoid-operated fluid pilot valve of the invention with portion shown partially in cross-section.
Figure 2:
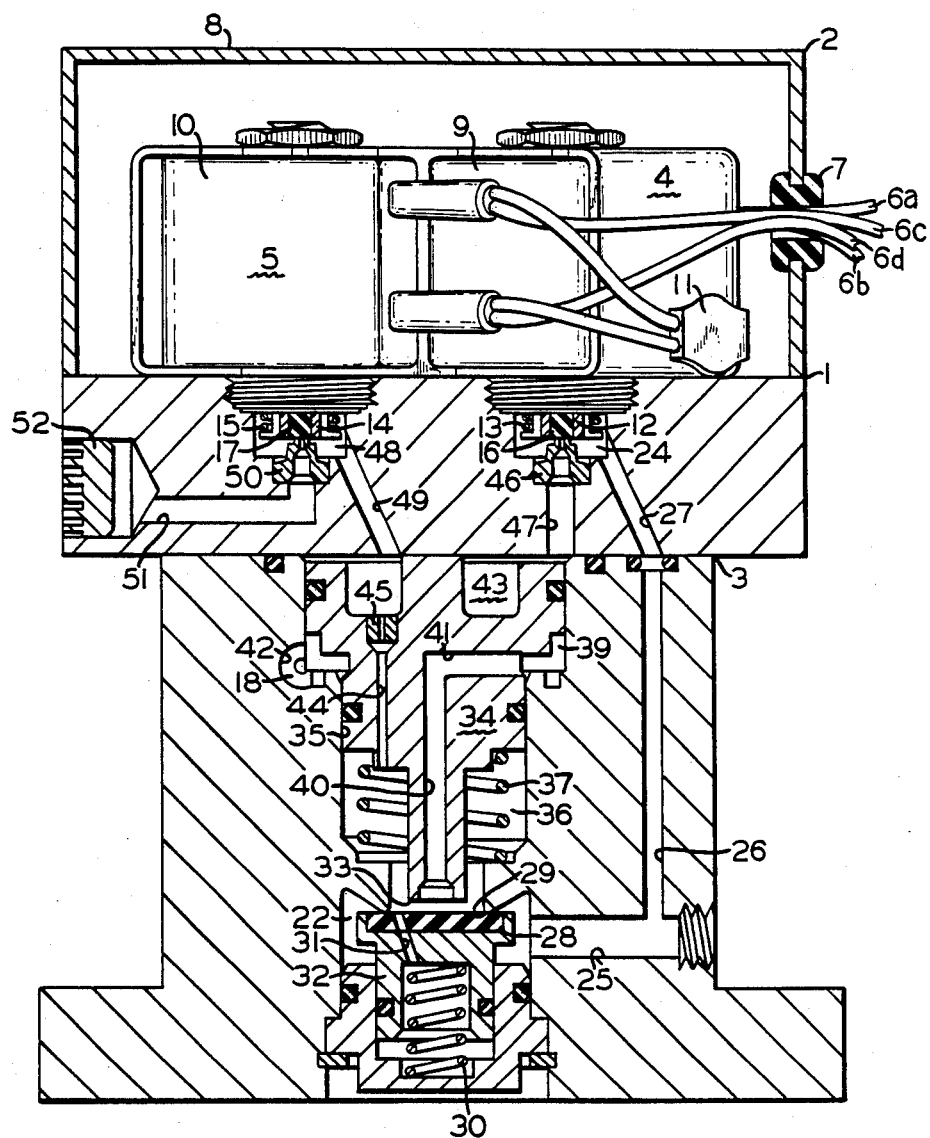
FIG. 2 is a cross-sectional view taken along lines II—II of FIG. 1, showing the details of the invention with the pilot piston in its brake-application position.

Referring now to the drawings, and in particular to FIGS. 1 and 2, there is shown the electromagnet or solenoid-operated fluid pilot valve 1 having an upper magnet portion 2 and a lower valve portion 3. As shown in FIG. 2, the magnet portion 2 includes a pair of electrical solenoids 4 and 5, each of which is selectively momentarily energized via leads 6a–6d. The leads pass through an insulating grommet 7 which is mounted in the side wall of a protective cover 8. The leads 6a and 6b supply electrical power to a brake-release coil 9 of the solenoid 4 while the leads 6c and 6d supply electrical power to a brake-application coil 10 of the solenoid 5. A surge suppressor, one of which is characterized by numeral 11, shunts each of the solenoid coils to dissipate the energy when the magnetic field collapses. A magnetic armature 12 is centrally disposed within the release solenoid coil 9 and is biased downwardly by gravity and the caged helical spring 13. Similarly, the application solenoid coil 10 includes a centrally disposed magnetic armature 14 which is biased downwardly by gravity and the caged helical spring 15. The solenoid armature 12 carries a supply pilot valve 16 while the solenoid armature 14 has a centrally disposed exhaust pilot valve 17.

The valve body portion 3 includes a main supply port 19, a delivery port 20, and an exhaust port 21. The supply port 19 is connected to supply chamber 22 via a passageway 23. The supply chamber 22 is in communication with a release pilot chamber 24 via passageways 25, 26 and 27 formed in the valve body 3. As shown, a supply valve 28 is located in the chamber 22 and is urged against a supply valve seat 29 by a helical compression spring 30. An equalizing passage 31 is formed in the supply valve 28 and its body 32 to relieve any pressure differential buildup between opposite sides of the valve. The valve 28 is disposed in cooperative association with an exhaust valve seat 33 formed on the lower end of a pilot piston 34 located in a central bore 35 formed in the valve body 3. A delivery chamber 36 is formed under pilot piston 34 which is urged upward by a helical compression spring 37. The delivery chamber 36 is connected to delivery port 20 via passageway 38 as shown in FIG. 1. It will be seen that the delivery chamber 36 is also in communication with a exhaust chamber 39 via passageways 40 and 41 when the exhaust valve is unseated. The exhaust chamber 39 is connected to exhaust port 21 via passageway 42 and choke 18 as shown in FIGS. 1 and 2. The choke 18 assists in holding the piston 34 in a brake-release position. A pilot chamber 43 is formed on the upper side of the pilot piston 34. The pilot chamber 43 is in communication with the delivery chamber 36 via a feedback path or latching circuit formed by passageway 44 and choke 45 located in the body of the pilot piston 34.

It will be seen that the pilot chamber 43 is connected to a ported supply valve seat 46 via passageway 47 and is connected to an application pilot chamber 48 via passageway 49. The exhaust pilot valve 17 is disposed in cooperative association with a ported exhaust valve seat 50. The valve seat is connected to atmosphere via a passageway 51 and a wasp excluder 52.

Figure 3:
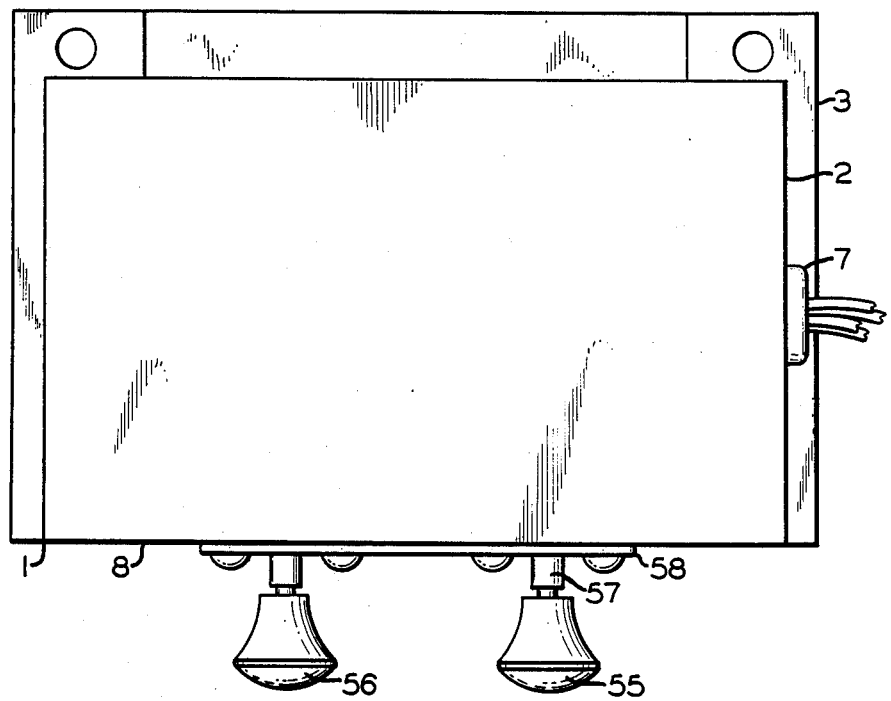
FIG. 3 is a top plan view of the solenoid-operated fluid valve shown in FIG. 1.

It will be appreciated in case of electrical power failure or coil damage, it is advantageous to have an alternate means of operating either of the pilot valves. As shown in FIG. 3, a pair of manual override operators, including push knobs 55 and 56, are located in the upper end of the valve body 3. The two overrides are substantially identical and are operated in the same manner and, therefore, only the structure of the manual operator associated with supply pilot valve 16 will be described in detail. As shown in FIGS. 1 and 3, the operating knob 55 is connected to the exterior end of a push rod 57 which extends through screw-attached cover plate 58. As shown in FIG. 1, the push rod 57 included an enlarged intermediate portion 59 having an annular groove 60 for accommodating a sealing ring 61. A helical compression spring 62 is disposed in bore 63 to normally urge the operator to an outer limit position. The push rod includes an inner reduced portion 64 having a tapered or pointed tip 65 which engages the underside of armature 12 for unseating the supply valve 16 when the hand knob 55 is pushed inwardly to an inner limit position.

In describing the operation of the device, it will be assumed that the solenoid coils are deenergized, that the manual operators are in the inoperative position, and that the various valves and pilot pistons are in the positions as shown in the drawings. Under these conditions, the main supply valve 28 is closed by the compression force of spring 30 so that the supply chamber is cut off from the delivery chamber 36. It will be seen that the pilot piston 34 is urged to its uppermost position under the influence of the compressive force of biasing spring 37. The pilot valves 16 and 17 are both closed by the compressive forces of their respective biasing springs 13 and 14. Thus, the delivery port 20 is connected via passageway 38 to delivery chamber 36 via passageways 40 and 41 to exhaust chamber 39 and via passageway 42 to exhaust port 21 so that the brakes are applied by the spring in the brake unit.

Let us now assume that it is desired to pressurize the delivery port 20 to effect a brake release. It is simply necessary to momentarily energize the coil 9 of the brake-release solenoid 4. The energization of the brake-release coil 9 raises the armature 12 against the spring 13 to unseat the pilot valve 16 wherein a fluid path is established from supply port 19 to the pilot piston chamber 43 via passageway 23, supply chamber 22, passageways 25, 26, 27, pilot chamber 24, ported pilot seat 46, and passageway 47. The pressure in chamber 43 cause the piston to be moved downwardly against the force of spring 37. As the piston 34 moves downwardly, the exhaust valve is initially closed by the seating of valve seat 33 against valve member 28. As the piston 34 continues to move downwardly, the exhaust valve seat 33 moves the valve member 28 against the spring 30 to open the supply valve. Since the supply valve is a balanced device, very little effort or force is required to unseat member 28 from the supply valve seat 29. However, the piston 34 has considerable force to fully open the supply valve. With the supply valve opened and the exhaust valve closed, the delivery port 20 is pressurized by a fluid path extending from supply port 19 via passageway 23, to supply chamber 22, through the supply valve 28, past seat 29, to delivery chamber 36, and via passageway 38 to port 20. Since the solenoid coil 9 is only momentarily energized, the brake-release pilot valve 16 is quickly closed by return spring 13 to shut off the supply path from port 19. However, the pressure in chamber 43 is trapped since the exhaust pilot valve 17 is also closed. In the event that the pilot chamber 43 develops a leak, it will be seen that the piston 34 is pneumatically latched by a fluid feedback path formed by passageway 44 and choke 45. The passageway 44 and choke 45 supply pressure from the delivery chamber 36 to the pilot chamber 43 to maintain the piston 34 in its downward position. Thus, with the delivery port 20 pressurized, the brakes of the train are released by pressure overcoming the force of the spring in the brake unit. The solenoid-operated pilot valve 1 will remain in this brake-release position as long as supply pressure is applied to port 19.

Let us now assume that a brake application is desired. In this case, it is simply necessary to momentarily energize the brake-application solenoid coil 10 which raises the armature 14 and opens the exhaust pilot valve 17. Thus, the pilot chamber 43 is quickly exhausted to atmosphere via passageway 49, chamber 48, ported exhaust pilot valve seat 50, passageway 51, and wasp excluder 52. With the pilot chamber 43 exhausted, the return spring 37 quickly moves the piston 34 upwardly to its upper position as shown in FIG. 2. As the piston 34 begins to move upwardly, the supply valve member 28 is forced by spring 30 against seat 29 to close off the delivery chamber 36 from the supply chamber 22. Further, upward movement of piston 34 causes unseating of the exhaust valve which exhausts the delivery chamber 36 to atmosphere via passageways 40 and 41, exhaust chamber 39, passageway 41, and exhaust port 21. Thus, the valve will resume its position as shown in FIG. 2. It will be seen that the feedback path formed by passageway 44 and choke 45 will prevent the piston 34 from being accidentally moved to its brake-release position since pressure leaking across pilot release valve 16 will be vented to atmosphere via the exhausted delivery chamber 36.

It will be seen that the design of the piston 34 to provide a high initial force when the piston is moved in either direction to initially overcome the buildup of static friction which commonly occurs during long periods of inactivity. The pneumatic feedback path or latch-up circuit is designed to hold the piston 34 in the traveled or last assumed position after a command is received to proceed to that position. It has been found that certain trapped pressure valve devices are capable of assuming an incorrect position due to leakage of pressure which is intended to hold the piston in the last commanded position. The presently described valve will maintain the piston 34 in the last commanded position, and yet permit the piston to travel to its normal position upon command without the use of mechanical detents or toggles.

It will be appreciated that various changes and modifications may be made to the subject device without departing from the spirit and scope of the invention. The feedback latching circuit employing the passageway 44 and choke 45 could be located in the body of the valve 1 rather than in the piston 34. Accordingly, it is understood that the invention is not limited to the specific details herein set forth but should be given the breadth as set forth by the features and limitations of the appended claims.

Having now described the invention, what I claim as new and desired to secure by Letters Patent, is:

1. A magnet valve for selectively establishing communication between a supply port and a delivery port and between an exhaust port and the delivery port comprising, a magnet portion having an application solenoid valve and a release solenoid valve, a valve portion having a pilot piston, an exhaust seat and a supply valve, a supply chamber connected to the supply port, a delivery chamber connected to the delivery port, a pilot chamber connectable to the supply port through the release solenoid valve to cause movement of the pilot piston wherein the exhaust seat is initially closed and the supply valve subsequently opens communication between the supply chamber and the delivery chamber, feedback means formed in the pilot piston for connecting the delivery chamber to the pilot chamber for retaining the pilot piston in the moved position, a manual override for the application solenoid valve for opening a pilot valve for establishing a fluid path from the supply chamber to the pilot chamber, and a manual override for the release solenoid valve for opening a pilot valve for establishing a fluid path from the delivery chamber and the pilot chamber to the exhaust port.

2. The magnet valve, as defined in claim 1, wherein said feedback means is a restricted passageway formed in said pilot piston.

3. The magnet valve, as defined in claim 1, wherein said feedback means includes a passage and a choke formed in said pilot piston.

4. The magnet valve, as defined in claim 1, wherein said pilot piston is spring-biased away from said supply valve.

5. The magnet valve, as defined in claim 1, wherein said supply valve is normally biased to a closed position.

6. The magnet valve, as defined in claim 1, wherein said application and release valves are normally biased to a closed position.

7. An electromagnetic control valve comprising, first and second solenoids for controlling the condition of associated first and second pilot valves, a pilot piston movable between a first and a second position, a pilot chamber located on one end of said pilot piston, a delivery chamber located on the other end of said pilot piston, an exhaust valve seat formed on the other end of said pilot piston and leading to an exhaust port, a supply valve disposed adjacent said exhaust valve seat and normally biased to close off a supply chamber from the delivery chamber, a supply port leading to said supply chamber and to said first pilot valve, a delivery port leading to said delivery chamber, a feedback connection formed in said pilot piston and leading from said delivery chamber to said pilot chamber for latching said pilot piston in the second position, a manual override for said first solenoid for opening said first pilot valve for establishing a fluid path from said supply chamber to said pilot chamber, and a manual override for said second solenoid for opening said second pilot valve for establishing a fluid path from said delivery chamber and said pilot chamber to said exhaust port.

8. The electromagnetic control valve, as defined in claim 7, wherein said pilot piston is spring-biased to the first position.

9. The electromagnetic control valve, as defined in claim 7, wherein said first and second pilot valves are spring-biased to closed positions.

* * * * *